United States Patent
Huang

(10) Patent No.: US 9,039,297 B2
(45) Date of Patent: May 26, 2015

(54) FIXING DEVICE FOR OPTICAL FIBER DETECTION

(71) Applicant: Hon Hai Precision Industry Co., Ltd., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 88 days.

(21) Appl. No.: 13/911,100

(22) Filed: Jun. 6, 2013

(65) Prior Publication Data

US 2014/0126861 A1   May 8, 2014

(30) Foreign Application Priority Data

Nov. 8, 2012  (TW) ............... 101141683 A

(51) Int. Cl.
G02B 6/42      (2006.01)
(52) U.S. Cl.
CPC .............. *G02B 6/423* (2013.01); *G02B 6/4249* (2013.01); *G02B 6/42* (2013.01)
(58) Field of Classification Search
CPC .... G02B 6/4219; G02B 6/4228; G02B 6/423; G02B 6/424; G02B 6/4243; G02B 6/4244; G02B 6/4245; G02B 6/4257; G02B 6/4259; G02B 6/4286
See application file for complete search history.

(56) References Cited

U.S. PATENT DOCUMENTS

| | | | | |
|---|---|---|---|---|
| 5,260,587 A * | 11/1993 | Sato | ................................. | 257/88 |
| 5,337,392 A * | 8/1994 | Mousseaux et al. | ............ | 385/90 |
| 5,853,626 A * | 12/1998 | Kato | ............................. | 264/1.25 |
| 5,896,481 A * | 4/1999 | Beranek et al. | ................. | 385/90 |
| 5,909,523 A * | 6/1999 | Sakaino et al. | ................. | 385/49 |
| 6,151,430 A * | 11/2000 | Traver et al. | ..................... | 385/14 |
| 6,652,158 B2 * | 11/2003 | Bartur et al. | ..................... | 385/92 |
| 6,917,056 B2 * | 7/2005 | Dautartas et al. | ............... | 257/98 |
| 7,050,678 B1 * | 5/2006 | Isono et al. | ...................... | 385/39 |
| 7,102,835 B2 * | 9/2006 | Uekawa et al. | ................ | 359/811 |
| 7,350,982 B2 * | 4/2008 | Ohtsu et al. | ..................... | 385/59 |
| 2002/0015557 A1 * | 2/2002 | Yap et al. | ........................ | 385/33 |
| 2002/0037137 A1 * | 3/2002 | Wu et al. | ......................... | 385/49 |
| 2002/0126965 A1 * | 9/2002 | Miyokawa | ....................... | 385/92 |
| 2004/0042739 A1 * | 3/2004 | Maeno | .............................. | 385/89 |
| 2012/0213475 A1 * | 8/2012 | Selli et al. | ......................... | 385/33 |
| 2013/0129281 A1 * | 5/2013 | Son et al. | ......................... | 385/33 |

FOREIGN PATENT DOCUMENTS

DE     102006008091 B4 *  1/2010
EP            704732 A1 *  4/1996

* cited by examiner

*Primary Examiner* — Michelle R Connelly
(74) *Attorney, Agent, or Firm* — Novak Druce Connolly Bove + Quigg LLP

(57) ABSTRACT

An optical fiber fixing device includes a base, first fixing block and a second fixing block. The base includes an upper surface has a receiving groove and a groove which is connected with the receiving groove. The receiving groove receives an optical fiber connector, the optical fiber connector receives a plurality of optical fibers, and two ends of the optical fibers separately protrude out of the optical fiber connector. The groove has an optical detecting device, the detecting device defines a plurality of light apertures. The first fixing block is set on the upper surface, which is configured to fix the optical fiber connector into the receiving groove. The second fixing block is received in the groove, in order to fix the detecting device in the groove, the plurality of light apertures are aligned with the plurality of optical fibers.

10 Claims, 3 Drawing Sheets

FIXING DEVICE FOR OPTICAL FIBER DETECTION

BACKGROUND

1. Technical Field

The present disclosure relates to an fixing device which is used for optical fiber detection.

2. Description of Related Art

An optical fiber is fixed on an optical connector, the optical fiber is fixed on a photoelectric converting module via the optical connector, making the optical fiber precisely align with an optical coupling lens in the photoelectric converting module. To receive the light signals from the optical fiber connector, the receiver needs to be precisely aligned with the optical fiber of the optical fiber connector. However, a manually positioned alignment between the optical connector and the receiving device is used to carry out optical measurement and assessment, however, takes a lot of time and decreases efficiency of inspection. Therefore, it is necessary to provide a fixing device for optical fiber to increase detection efficiency.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
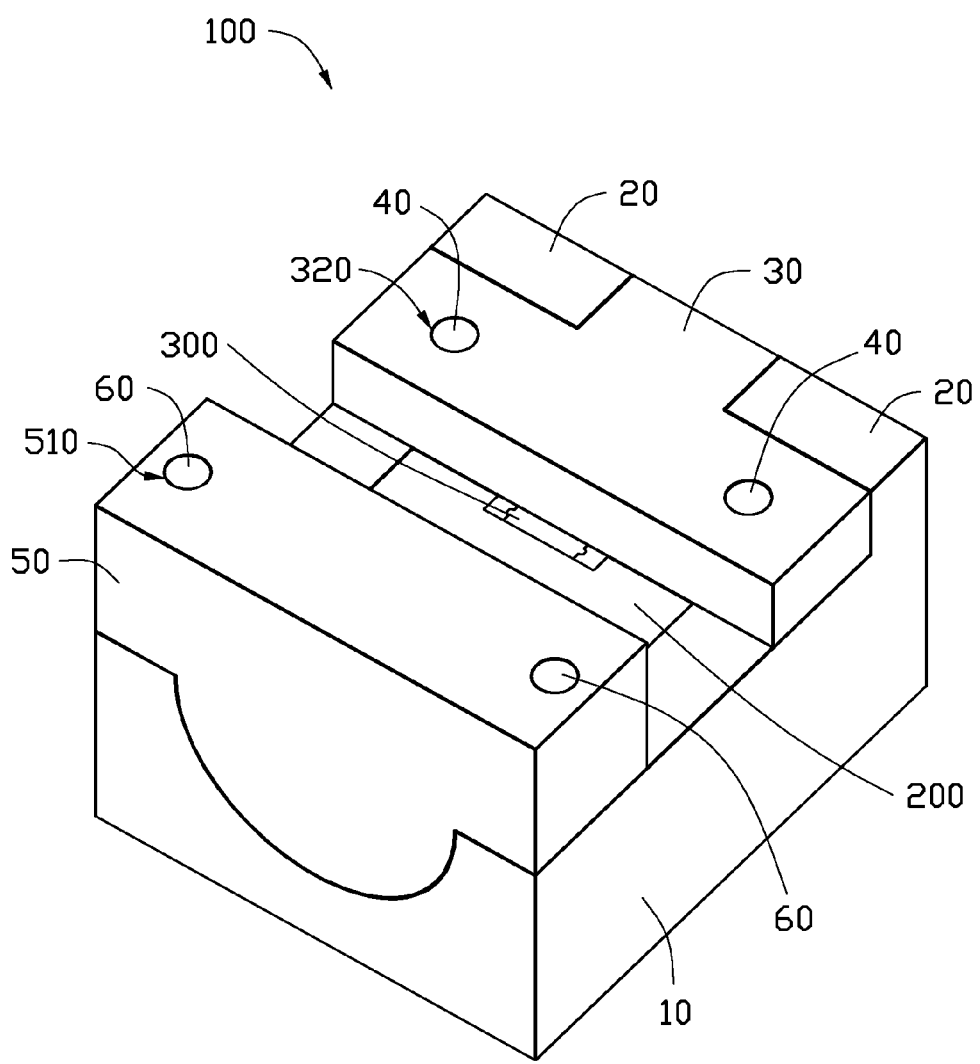
FIG. 1 is an assembled view of an optical fiber fixing device, a detecting device, and an optical connector.
Figure 2:
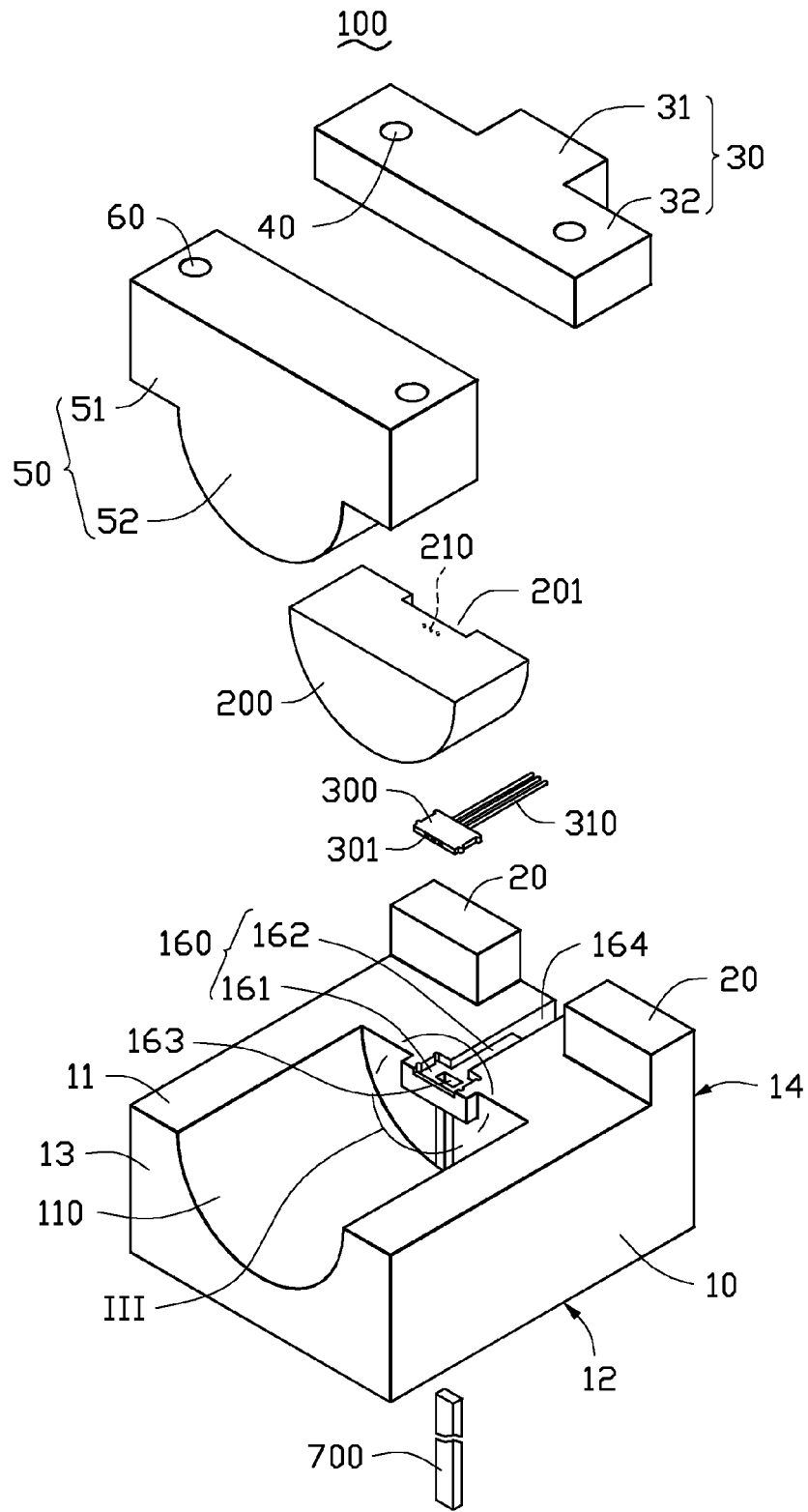
FIG. 2 is an exploded view of the optical fiber fixing device, detecting device, and optical connector of FIG. 1.

Embodiments will be described with reference to the drawings. Referring to FIGS. 1 to 2, an optical fiber fixing device 100 is used for simultaneously locating and fixing a detecting device 200 and an optical connector 300. The detecting device 200 is in shape of a semicircular column, and defines an opening 201. A plurality of light apertures 210 are defined at a bottom of opening 201. The optical connector 300 is substantially cuboid, and inside the optical connector 300, a plurality of trenches 301 are defined, where each of the trenches 301 are parallel to each other. The plurality of trenches 301 are configured to receive a plurality of optical fibers 310, where two ends of the plurality of fibers may protrude out of the plurality of trenches 301. In the present embodiment, the detecting device 200 is an optical power monitor. The optical fiber fixing device 100 includes a base 10, two positioning blocks 20, a first fixing block 30, two first fixing columns 40, a second fixing block 50, and two second fixing columns 60.

Figure 3:
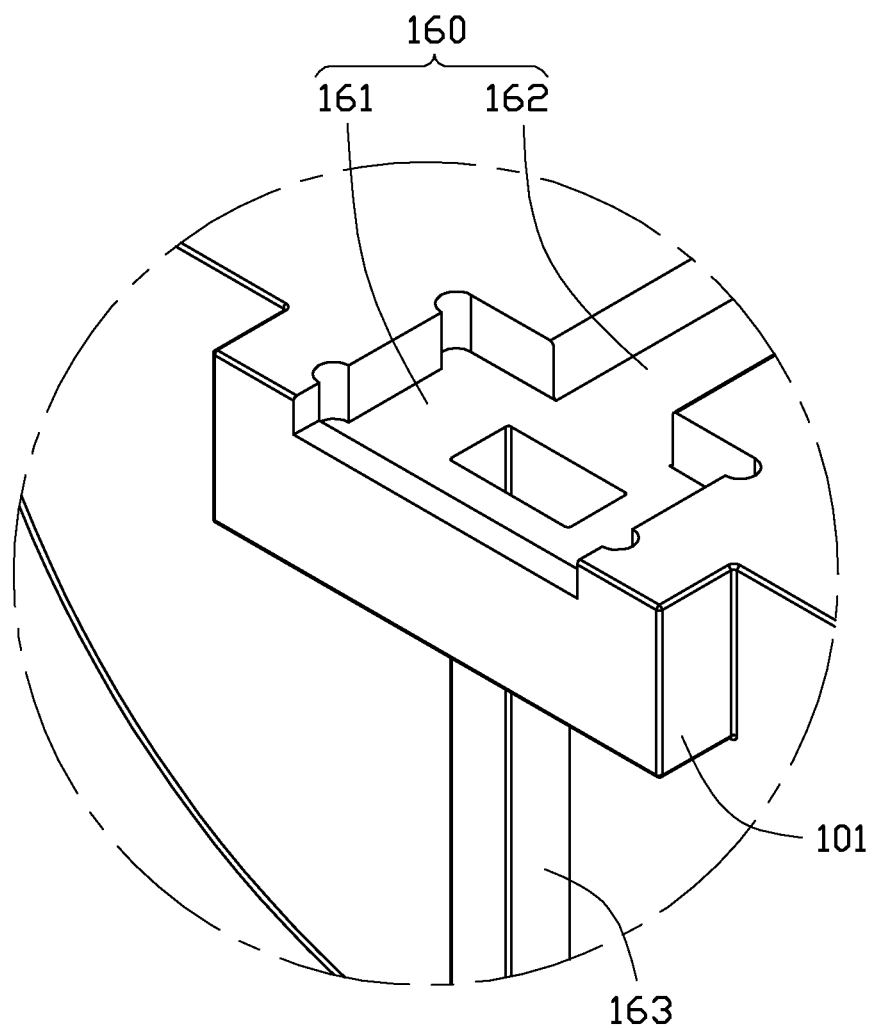
FIG. 3 is an enlarged view of circled portion III of FIG. 2.

The base 10 is substantially cuboid, and is made of iron, in one example. The base 10 includes an upper surface 11, a lower surface 12, a first side surface 13, and a second side surface 14. The lower surface 12 is opposite to the upper surface 11, the second side surface 14 is opposite to the first side surface 13, and all surfaces are connected with the upper surface 11 and the lower surface 12. The upper surface 11 defines a semicircular column groove 110 close to an end portion of the first side surface 13. The groove 110 passes through the first side surface 13. Diameter of the groove 110 is the same as diameter of the detecting device 200, and an outer circumferential surface of the detecting device 200 matches the groove 110. A protruding portion 101 protrudes from a bottom of the groove 110 facing toward the first side surface 13 (as shown in FIG. 3). One of the surfaces of the protruding portion 101 is flush with the upper surface 11. Size of the protruding portion 101 matches the opening 201, enabling the protruding portion 101 is precisely engaged into the opening 201, further the detecting device 200 is aligned with the groove 110.

The upper surface 11 defines a T-shaped receiving groove 160. The receiving groove 160 includes a first receiving portion 161 and a second receiving portion 162. The second receiving portion 162 extends toward the second side surface 14 from the first receiving portion 161. One part of the first receiving portion 161 extends to the protruding portion 101, and is connected with the groove 110. The second receiving portion 162 is close to the second side surface 14. A length of the first receiving portion 161 is greater than a length of the second receiving portion 162. A size of the first receiving portion 161 matches a size of the fiber connector 300, for tightly and precisely receiving the fiber connector 300. An extending direction of the second receiving portion 162 is perpendicular to the second side surface 14, the second receiving portion 162 is used for receiving the optical fiber 310 which is protruded from the optical fiber connector 300.

Bottom of the first receiving portion 161 defines a first through groove 163, the first through groove 163 passes through the lower surface 12, and is connected with the groove 110. Since the optical fiber connector 300 is precisely located in the first receiving portion 161, therefore, when the optical fiber testing is completed, the optical fiber connector 300 is not easily jarred loose from the first receiving portion 161. An ejector device 700 inserted into the first through groove 163 is needed, in order to eject the optical fiber connector 300 out of the first receiving portion 161.

The second side surface 12 defines a second through groove 164 is connected with the second receiving portion 162, the second through groove 164 passes through both the upper surface 11 and the lower surface 12. The extending direction of the second through groove 164 is perpendicular to the extending direction of the second receiving portion 162. The second elongated groove 164 is configured to receive the optical fiber 310 which protrudes from the second elongated groove 164. Specifically, if the protrusion of the optical fiber 310 is too long from the second receiving portion 162, the protruding portion of the optical fiber 310 can be slightly bent, and then received into the second through groove 164. When the base 10 is standing, enabling the optical fiber 310 will not be broken during the detection process.

The two positioning blocks 20 are located on the upper surface 11 close to the second side surface 14, and located at opposite sides of the second receiving portion 162. Each of the positioning blocks 20 close to the surface of the second side surface 14 is flush with the second side surface 14. When the base 10 is standing, the two positioning blocks 20 and the second side surface 14 are simultaneously in contact with a workbench (FIG. not shown), ensuring a stability of the optical fiber fixing device 100. In the present embodiment, the two positioning blocks 20 and the base 10 are integrally formed.

The first fixing block 30 is substantially T-shaped, and includes a positioning portion 31 and a butting portion 32. The positioning portion 31 perpendicularly extends outward from a center of the butting portion 32. The positioning portion 31 is received between the two positioning blocks 20, enabling a bottom center of the butting portion 32 contact with the optical fiber connector 300 which is received in the receiving groove 160, for fixing the optical fiber connector 300. Two first through holes 320 are defined in the ends of the butting portion 32, the two through holes are stepped. Two first fixing columns 40 are stepped cylinders corresponding to the first through holes 320, and are separately received in the first through holes 320. In the present embodiment, since the base 10 is made of iron, the two first fixing columns 40 are magnetic, to create a strong attraction between the first fixing block 30 and the base 10.

The second fixing block 50 includes a cuboid base 51 and a complementary portion 52 which is a semicircular column. A length of the base 51 is longer than a diameter of the complementary portion 52. The complementary portion 52 extends outward from the center of the base 51. The diameter of the complementary portion 52 is equal to the diameter of the groove 110, making the complementary portion 52 a tight fit in the groove 110, in order to fix the detecting device 200 into the groove 110. Through holes 510 are defined in both ends of the base 51, the two through holes 510 are stepped. The two second fixing columns 60 are stepped cylinders corresponding to the second through holes 510, and are separately received in the second through holes 510. In the present embodiment, since the base 10 is made of iron, the two second fixing columns 60 are magnetic, in order to create a strong attraction between the second fixing block 50 and the base 10.

Assembly process of the optical fiber fixing device 100 is as follows: the optical fiber connector 300 is received into the first receiving portion 161, and the optical fiber 310 protrudes from the optical fiber connector 300, the optical fiber 310 which protrudes from the second receiving portion 162 is bent and received into the second through groove 164, the first fixing block 30 is arranged on the base 10, enabling the positioning portion 31 to be fixed between the two positioning blocks 20. The butting portion 32 makes contact with the optical fiber connector 300, allowing the two first fixing columns 40 to be separately received into the two first through holes 320, in order to fix the first fixing block 30 on the base 10. The detecting device 200 is received in the groove 110, and the second fixing block 50 is received in the groove 110, fixes the detecting device 200 between the second fixing block 50 and the receiving groove 160, and the light apertures 210 of the detecting device 200 correspond to the plurality of optical fibers 310, then the two second fixing column 60 are separately received into the two second through holes 510, in order to fix the second fixing block 50 on the base 10, therefore the optical fiber 310 can be detected by the detecting device 200.

Further, the second fixing block 50 and the detecting device 200 can be removed, and the optical fiber fixing device 100 is standing, for inspecting a cleanliness of the cutting end surface of the optical fiber 310. Also the first fixing block 30 can be removed, exposing the optical fiber 310 from the second receiving portion 162, to check whether an appearance of the optical fiber 310 meets any stipulated requirements. The optical fiber fixing device 100 of the present disclosure ensures that the detecting device 200 and the optical fiber connector 300 are precisely aligned, do not required to be manually positioned and therefore increases signal transmission accuracy and readability.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. An optical fiber fixing device comprising:
a base comprising an upper surface, the upper surface comprising a receiving groove and a groove;
a first fixing block; and
a second fixing block;
wherein the receiving groove is connected with the groove, the receiving groove is configured to receive an optical fiber connector, the optical fiber connector is configured to receive a plurality of optical fibers and two ends of the plurality of fibers that protrude out of the optical fiber connector; the groove is configured to receive a detecting device that comprises a plurality of light apertures; the first fixing block set on the upper surface for fixing the optical fiber connector into the receiving groove; the second fixing block received into the groove for fixing the detecting device between the second fixing block and the receiving groove, enabling the plurality of light apertures to be aligned with the plurality of optical fibers.

2. The optical fiber fixing device as claimed in claim 1, wherein the optical fiber fixing device comprises two positioning blocks, the two positioning blocks are located on the upper surface; the first fixing block comprises a positioning portion and a butting portion, the positioning portion received between the two positioning blocks, the butting portion contacting the optical fiber connector.

3. The optical fiber fixing device as claimed in claim 2, wherein the positioning portion perpendicularly extends outward from the center of the butting portion; two ends of the butting portion comprises at least two first through holes; the optical fiber fixing device comprises at least two first fixing columns, the at least two first fixing columns and the base attracting to each other, and the first fixing columns separately received in the first through holes.

4. The optical fiber fixing device as claimed in claim 3, wherein the groove is a semicircular column, the second fixing block comprises a base and a semicircular column complementary portion; diameter of the complementary portion is equal to diameter of the groove, making the complementary portion tightly fit in the groove.

5. The optical fiber fixing device as claimed in claim 4, wherein the base comprises at least two second through holes; the optical fiber fixing device comprises at least two second fixing columns, the at least two second fixing columns and the base attracting to each other, and the second fixing columns being separately received in the second through holes.

6. The optical fiber fixing device as claimed in claim 5, wherein the base is made of iron, and the first fixing column and the second fixing columns are magnetic.

7. The optical fiber fixing device as claimed in claim 1, wherein the base comprises a first side surface connecting with the upper surface, the groove passing through the first side surface; a protruding portion protruding from a bottom of the groove, the detecting device comprises an opening, size of the protruding portion matches with the opening, enabling the protruding portion to engage into the opening, further aligning the detecting device with the groove.

8. The optical fiber fixing device as claimed in claim 7, wherein one of surfaces of the protruding portion is flush with the upper surface, the receiving groove comprises a first receiving portion and a second receiving portion, one part of the first receiving portion extending to the protruding portion; the second receiving portion is used for receiving the optical fiber protruding from the optical fiber connector.

9. The optical fiber fixing device as claimed in claim 8, wherein the base further comprises a lower surface opposite to the upper surface, bottom of the first receiving portion comprises a first through groove, the first through groove passing through the lower surface, and connecting with the groove.

10. The optical fiber fixing device as claimed in claim 9, wherein the base further comprises a second side surface opposite to the first side surface, the second side surface comprises a second through groove connecting with the second receiving portion, the second through groove passing through both the upper surface and the lower surface.

* * * * *